United States Patent [19]

Mashio et al.

[11] Patent Number: 5,340,555
[45] Date of Patent: Aug. 23, 1994

[54] PROCESS FOR TREATING HALOGENATED HYDROCARBON CONTAINING-GAS, AN APPARATUS THEREFOR AND AN AGENT FOR DECOMPOSING HALOGENATED HYDROCARBON

[75] Inventors: Fujio Mashio; Naomi Itoya, both of Kyoto, Japan

[73] Assignee: Nippon Paint Co., Ltd., Osaka, Japan

[21] Appl. No.: 887,651

[22] Filed: May 26, 1992

Related U.S. Application Data

[62] Division of Ser. No. 756,306, Sep. 6, 1991, abandoned.

[30] Foreign Application Priority Data

Sep. 7, 1990 [JP] Japan ................... 2-238539
Sep. 8, 1990 [JP] Japan ................... 2-238082

[51] Int. Cl.$^5$ ............................. B01D 53/34
[52] U.S. Cl. ..................... 423/240 R; 588/206; 588/207
[58] Field of Search ............ 423/240 R, DIG. 20, 423/488, 481; 588/206, 207; 208/262.1

[56] References Cited

U.S. PATENT DOCUMENTS

| | | | |
|---|---|---|---|
| 3,876,716 | 4/1975 | Campbell | 260/655 |
| 4,468,297 | 8/1984 | Sawyer et al. | 204/59 R |
| 4,668,793 | 5/1987 | Nagata et al. | 548/317 |
| 4,801,331 | 1/1989 | Murase | 252/364 |
| 4,934,149 | 6/1990 | DeVault et al. | 62/46.3 |
| 5,141,941 | 8/1992 | Fujii et al. | 514/256 |

FOREIGN PATENT DOCUMENTS

| | | | |
|---|---|---|---|
| 516519 | 9/1955 | Canada | 252/364 |
| 450274 | 6/1975 | U.S.S.R. | 252/364 |
| 630248 | 10/1949 | United Kingdom | |

*Primary Examiner*—Michael Lewis
*Assistant Examiner*—Stuart L. Hendrickson
*Attorney, Agent, or Firm*—Wenderoth, Lind & Ponack

[57] ABSTRACT

The present invention provides a process of effectively absorbing and decomposing a halogenated hydrocarbon so as not to exhaust it in the air. The present invention provides a process for treating a gas containing halogenated hydrocarbon, which comprises the following steps:

(a) the gas containing halogenated hydrocarbon is contacted with a solution which contains an aprotic polar compound having a 5 or 6 membered ring and a nitrogen at an alpha-position of a carbonyl, to absorb and recover a portion of the halogenated hydrocarbon, and (b) the gas, which is exhausted from the step (a) and still contains halogenated hydrocarbon, is contacted, with heating, with a mixture solution of an aprotic polar compound and a caustic alkali to decompose the halogenated hydrocarbon.

6 Claims, 5 Drawing Sheets

PROCESS FOR TREATING HALOGENATED HYDROCARBON CONTAINING-GAS, AN APPARATUS THEREFOR AND AN AGENT FOR DECOMPOSING HALOGENATED HYDROCARBON

This application is a division of now abandoned application Ser. No. 07/756,306, filed on Sep. 6, 1991.

FIELD OF THE INVENTION

The present invention relates to a process for treating a gas containing halogenated hydrocarbon (e.g. Freon gas or hydrocarbon chloride), an apparatus therefor and an agent for decomposing the halogenated hydrocarbon.

BACKGROUND OF THE INVENTION

Hydrocarbon chlorides (such as methylene chloride, 1,1,1-trichloroethane, trichloroethylene, tetrachloroethylene and carbon tetrachloride) have been widely used as a dissolving agent of rubber and fatty acid or a cleaning agent for dry cleaning and precision machines and elements. The hydrocarbon chlorides have many advantages in low melting point, high solubility or detergency, non-combustibility and so on, but have some disadvantages in toxicity and carcinogenicity. They are therefore used under very limited conditions, e.g. limited concentration in drainage. Air pollution based on the hydrocarbon chlorides is also a big problem and very strict regulations have been applied since April in 1989 in Japan.

The hydrocarbon chlorides are recovered or removed by an active carbon adsorption method which, however, is insufficient because the adsorbing rate is poor and the recovering process is complicated.

Hydrocarbon fluorides or Freons (such as trichlorofluoromethane (Freon 11), trichlorotrifluoroethane (Freon 113) and dichlorodifluoromethane (Freon 12)) have also been widely used for spraying, refrigerant, a foaming agent, a solvent and a cleaning agent for IC or precision machine and elements. The hydrocarbon fluorides have a wide boiling point range within $-40°$ to $50°$ C. and very low toxicity. They also have high solubility with oil and organic material and therefore exhibit very high detergency. Accordingly, the hydrocarbon fluorides are very important in recent industries.

However, in 1974, Professor Lorland of California University warned that Freon gas which was exhausted into air reached to the stratosphere without being decomposed in the troposphere and was decomposed a strong ultraviolet beam at the stratosphere, so as to cause the decomposition or destruction of the ozone layer. He added that the destruction of the ozone layer reduced the ultraviolet beam absorbing capacity of the ozone layer and adversely increased ultraviolet beam which reached to the earth's surface, so as to adversely affect the ecosystem. This means that, in respect to human beings, bad effects such as increase of skin cancer would be increased. He further warned that the destruction of the ozone layer is a public pollution on the whole earth. After that, many researches and studies have been conducted to find that ozone holes above the south pole and increase of skin cancer have been observed. AS the result, it is recognized that the phenomena are substantial and a serious threat to human beings, and have been considered as important problems in many international congresses, such as Montreal Protocol and Den Haag International Congress.

It is strongly desired to inhibit the use of some Freon and to develop Freon substitutes. It also has been intensely studied to recover Freon and not to exhaust it in the air.

SUMMARY OF THE INVENTION

The present invention provides a process of effectively absorbing and decomposing a halogenated hydrocarbon so as not to exhaust it in the air. Accordingly the present invention provides a process for treating a gas containing halogenated hydrocarbon, which comprises the following steps:

(a) the gas containing halogenated hydrocarbon is contacted with a solution which contains an aprotic polar compound having a 5 or 6 membered ring and a nitrogen at an alpha-position of a carbonyl, to absorb and recover a portion of the halogenated hydrocarbon, and (b) the gas, which is exhausted from the step (a) and still contains halogenated hydrocarbon, is contacted, with heating, with a mixture solution of an aprotic polar compound and a caustic alkali to decompose the halogenated hydrocarbon.

The present invention also provides an apparatus for treating a gas containing halogenated hydrocarbon, comprising an inlet for introducing said gas containing halogenated hydrocarbon, a first gas-liquid contacting means for contacting said gas with a solution which contains an aprotic polar compound having a 5 or 6 membered ring and a nitrogen at an alpha-position of a carbonyl, to absorb and recover a portion of the halogenated hydrocarbon, a second gas-liquid contacting mean for contacting, with heating, the gas which is exhausted from the first gas-liquid contacting means and still contains halogenated hydrocarbon, with a mixture solution of an aprotic polar compound and a caustic alkali, and an outlet for exhausting the gas which has been passed through the second gas-liquid contacting means.

The present invention further provides an agent for decomposing halogenated hydrocarbon comprising 1,3-dimethyl-2-imidazolidinone and a caustic alkali.

DETAILED DESCRIPTION OF THE INVENTION

Figure 2:
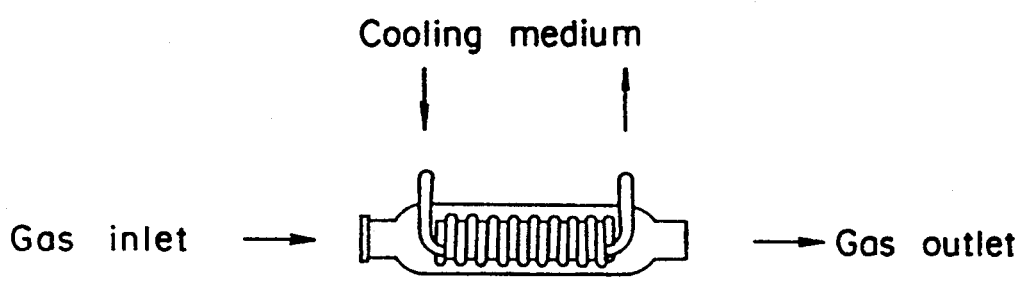
FIG. 2 shows a sectional view of an apparatus in the cooling step of the present invention.

A gas to be treated, which contains halogenated hydrocarbons, is generally sent to a first (absorbing) step (a) via a cooling step, but may be directly sent to the first step without the cooling step. The cooling step is conducted for liquefying a portion of the halogenated hydrocarbons from the gas by cooling it, when the halogenated hydrocarbons are present at a high concentration. The cooling step is carried out with a simple condenser as shown in FIG. 2, but various types of coolers or condensers which are known to the skilled in the art can be used.

In the first step, the gas is contacted with a solution which contains an aprotic polar compound having a 5 or 6 membered ring and a nitrogen at an alpha-position of a carbonyl. The aprotic polar compound is known to the art, but generally is represented by the following chemical formula:

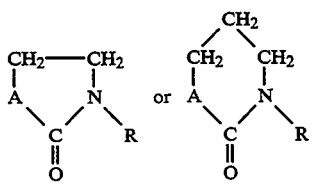

wherein A represents a methylene group or —NR— in which R snows an alkyl group having 1 to 3 carbon atoms. Typical examples of the aprotic polar compounds are 1,3-dimethyl-2-imidazolidinone (DMI), N-methyl-2-pyrrolidone (NMP), 1,3-dimethyl-2-oxohexahydropyrimidine and a mixture thereof. Preferred are those having a dipole moment of 3.7 to 4.8 D, especially 4.0 to 4.7 D, such as 1,3-dimethyl-2-imidazolidinone (DMI), N-methyl-2-pyrrolidone (NMP) and 1,3-dimethyl-2-oxohexahydropyrimidine. If the dipole moment is outside the above range, absorption and desorption abilities of the halogenated hydrocarbon are deteriorated. Although the aprotic polar compounds have been used as reaction solvents, it has been found by the present inventors that the aprotic polar compounds are good absorption solvents for the halogenated hydrocarbons, such as hydrocarbon chloride or Freon gas.

Figure 3:
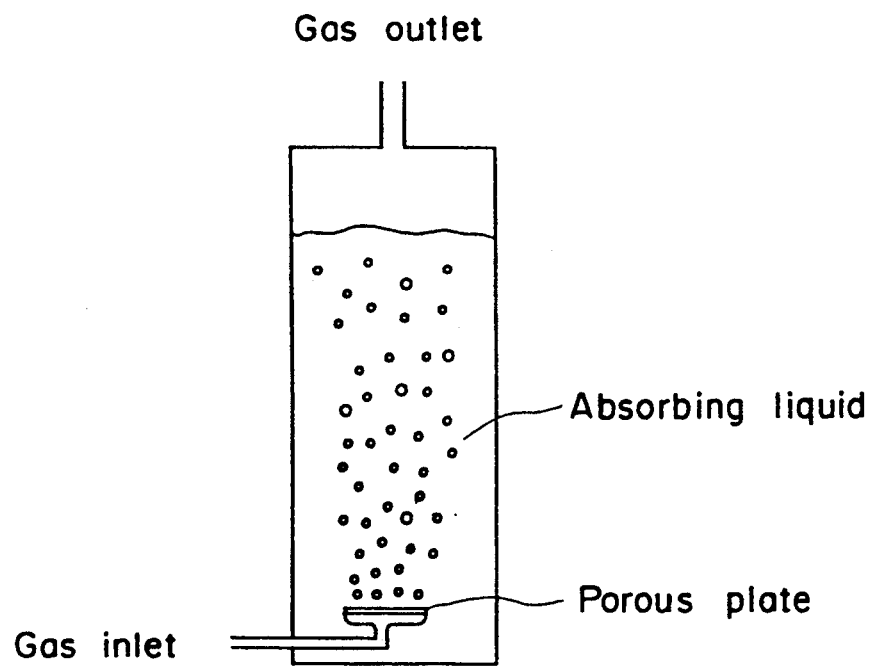
FIG. 3 shows an example of an apparatus used in the step (a) of the present invention, and FIGS. 4 and 5 also show other examples of it.
Figure 4:
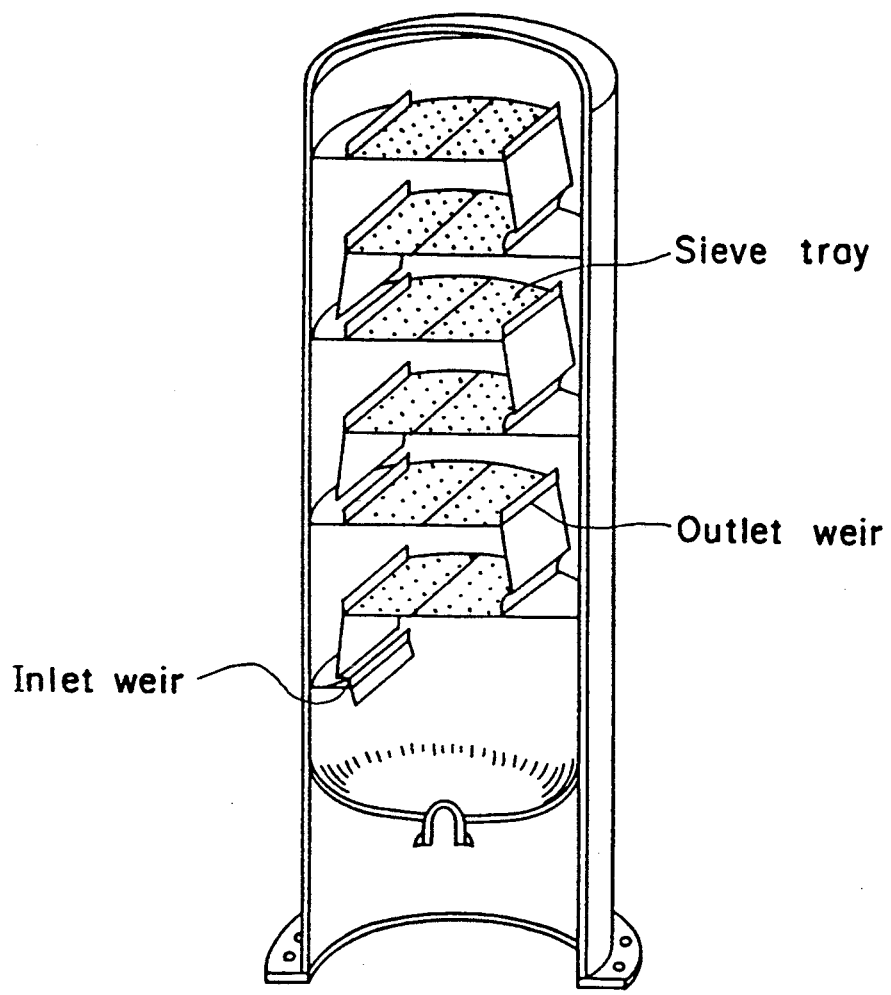
Figure 5:
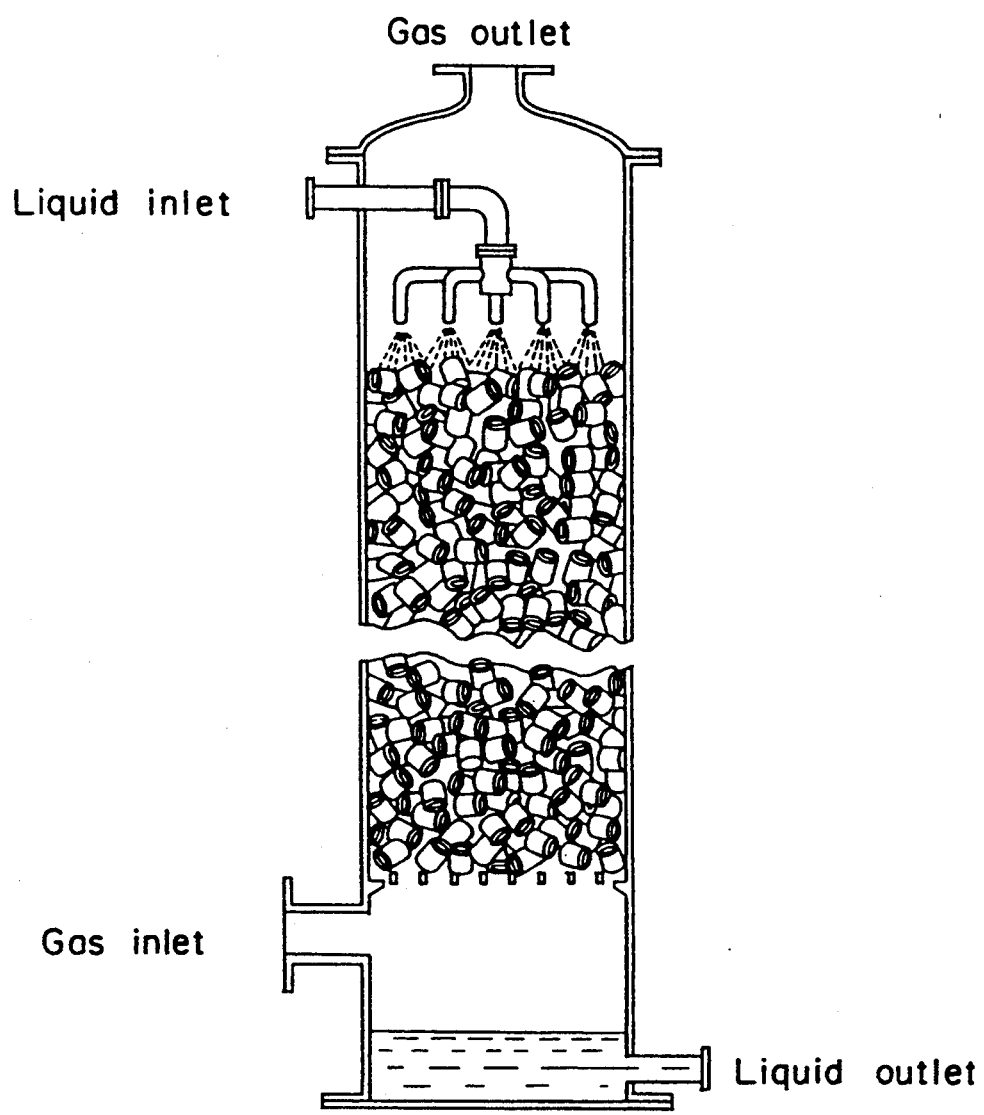

In the first step, a conventional gas-liquid contact process is employed. It is preferred that the contacting area of gas and liquid is made larger. Preferred means include a bubble tower (FIG. 3), a plate column (FIG. 4) and a packed column and the like. A cooling or pressuring apparatus may be attached to the first step, because a large amount of the halogenated hydrocarbon is absorbed when the absorbing liquid is cooled or the gas is pressurized.

Figure 1:
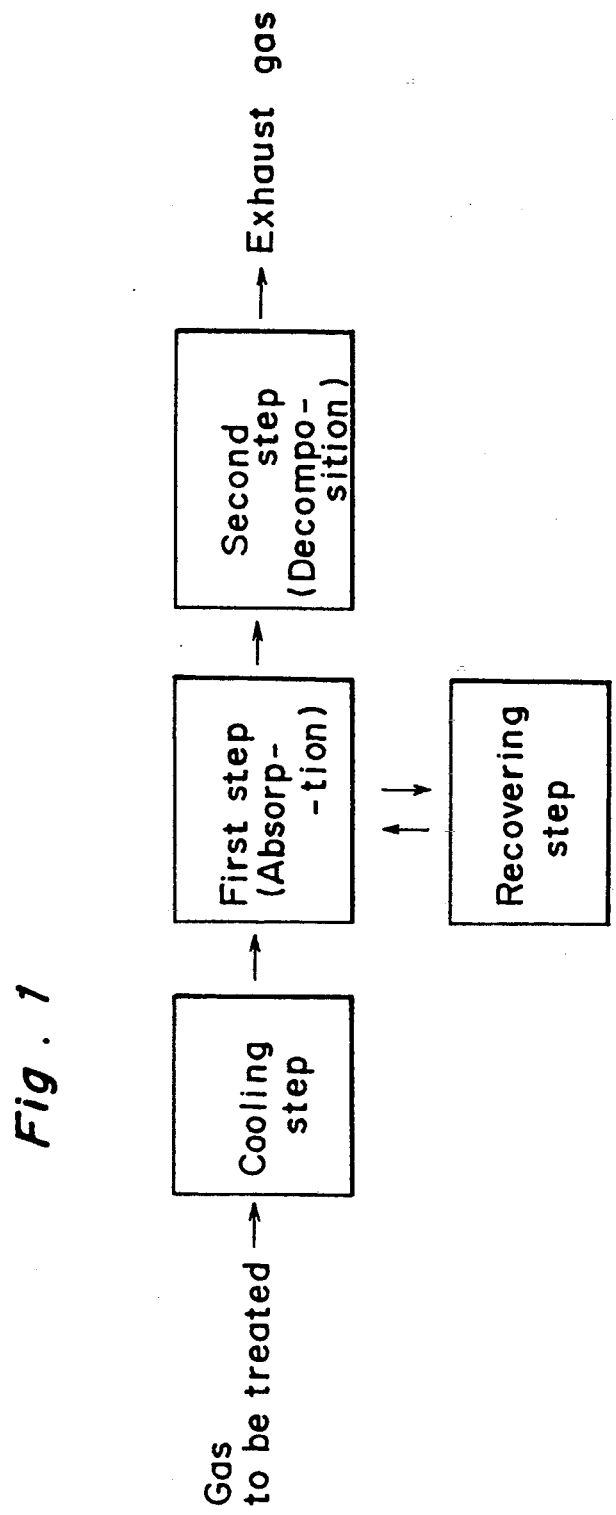
FIG. 1 shows a flow chart which explains the process of the present invention.

The absorbed halogenated hydrocarbon may be recovered or desorbed in a recovering step which is shown below the first step in FIG. 1. The recovering step is carried out by distillation, evaporation or introduction of heated air or nitrogen at a high recovery or a high purity. The distillation is generally conducted by a conventionally used distillation tower. The recovered halogenated hydrocarbon and aprotic polar compound can be used again as an absorbent.

The gas, in which a large amount of the halogenated hydrocarbon has been recovered in the first step, is then sent to the second step (a decomposing step). In the second (decomposing) step, the gas which still contains a small amount of the halogenated hydrocarbon is contacted, with heating, with an agent for decomposing halogenated hydrocarbon which contains the aprotic polar compound and a caustic alkali. The decomposing agent may contain water. In the decomposing step, the halogenated hydrocarbon is reacted with the caustic alkali to decompose it to lower molecular weight compounds. It is believed that the decomposition proceeds according to the following chemical reaction equations:

In case of 1,1,1-trichloroethane, $$CH_3CCl_3 + 4NaOH \rightarrow 3NaCl + CH_3COONa + 2H_2O \quad (1)$$

In case of Freon 11 and Freon 113

$$CCl_3F + 6NaOH \rightarrow 3NaCl + NaF + Na_2CO_3 + 3H_2O \quad (2)$$

$$CFCl_2CF_2Cl + 8NaOH \rightarrow 3NaCl + 3NaF + NaOOC-COONa + 4H_2O \quad (3)$$

Examples of the caustic alkalis are caustic soda, caustic potash, calcium hydroxide or a mixture thereof. The aprotic polar compound is the same as above-mentioned, and 1,3-dimethyl-2-imidazolidinone (DMI) is preferred. The weight ratio of the aprotic polar compound and the caustic alkali is not limited. The caustic alkali may be dissolved in the aprotic polar compound or an excess amount of it may be present in the aprotic polar compound. When water is added to the decomposing agent, it is preferred that an alkali resistant dispersant is also added thereto. Water may be contained in an amount of less than about 30 volume %, or less than 20 volume %, based on the volume of the aprotic polar compound. A large amount of water reduces the decomposition ability. The second step is also conducted using the same gas-liquid contacting apparatus as is explained in the first step. The treatment may be conducted at a temperature of 10° to 200° C., preferably 50° to 150° C. It may be conducted under pressure.

The gas, which is exhausted from the second step, contains little the halogenated hydrocarbon, but if necessary the halogenated hydrocarbon may be further removed by another method, such as plasma decomposing method, contact decomposing method and the like.

Figure 6:
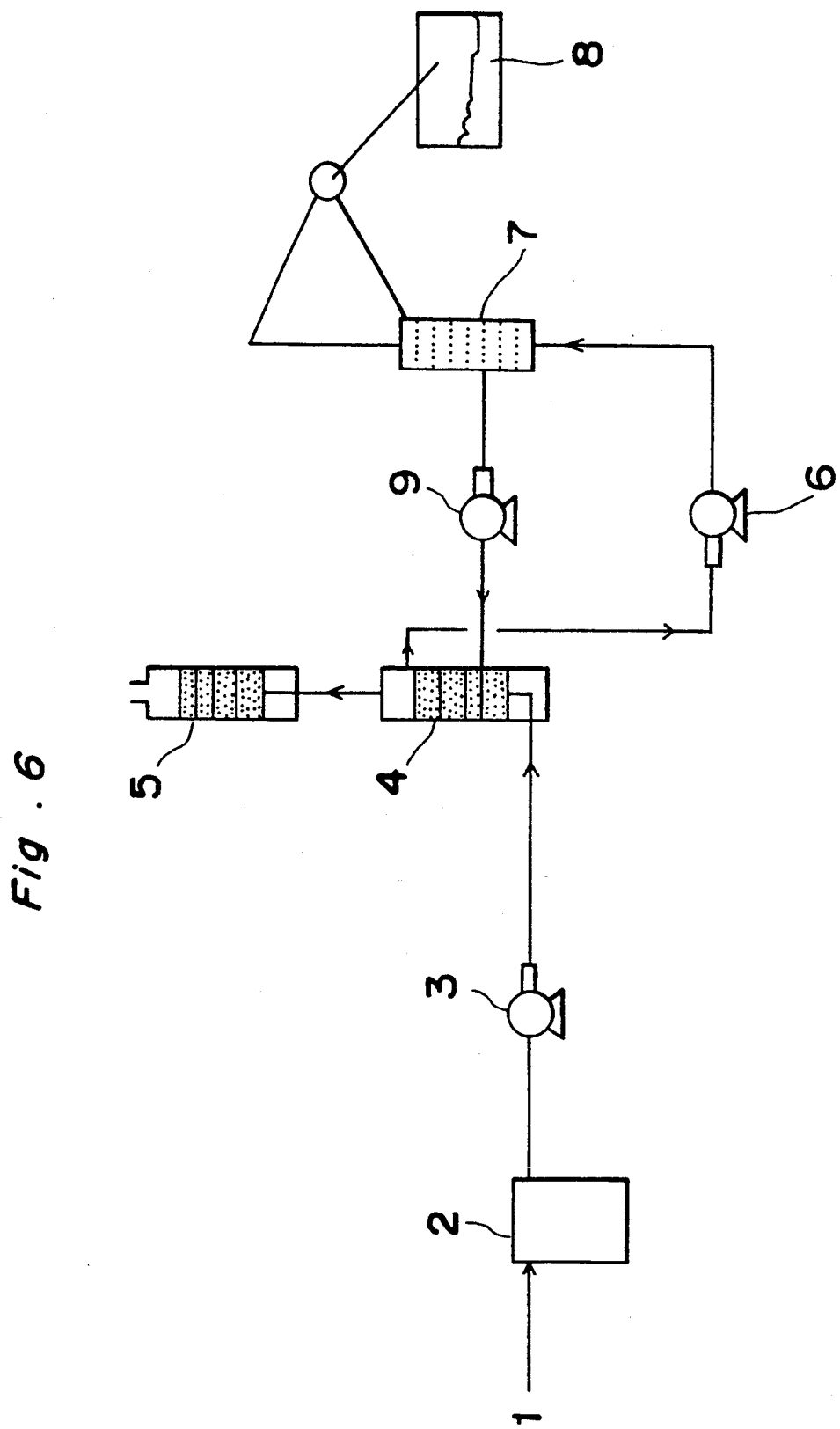
FIG. 6 shows a system for practicing the process of the present invention.

One embodiment of the apparatus of the present invention is shown in FIG. 6. The gas to be treated 1 is cooled in the cooling step 2 and then sent to an absorbing tower 4 through an air blower 3. The gas is then sent to a decomposing tower 5 from the top of the absorbing tower 4. The halogenated hydrocarbon which is absorbed in the absorbing tower 4 is sent to a continuous distillation tower 7 through a liquid pump 6. In the distillation tower 7, the halogenated hydrocarbon is recovered to obtain a recovered liquid 8. The distilled aprotic polar solvent in the distillation tower is again sent to the absorbing tower 4 through a liquid pump 9.

According to the present invention, in the absorbing process the halogenated hydrocarbon is effectively absorbed, and in the decomposing process it is decomposed at a high decomposing rate, thus reducing the content of the halogenated hydrocarbon to a degree at which it is not substantially present. Also, the absorbed halogenated hydrocarbon is recovered and employed again.

EXAMPLES

The present invention is illustrated by the following Examples which, however, are not to be construed as limiting the present invention to their details.

EXAMPLE 1

A pressure resistant glass autoclave was charged with 1 g of 1,1,1-trichloroethane and as a decomposing agent 100 ml of DMI, 2.4 g of caustic soda powder and 10 ml of water, and packed with a Teflon packing. It was heated at 100° C. for 2 hours with stirring. The amount of caustic soda is 2 times as much as the one calculated according to the above mentioned formula(1). The inside pressure increased 0.5 Kg/cm² and after 2 hours reduced to 0.2 Kg/cm². It was then cooled to ambient temperature.

After cooling, the autoclave was opened and the content was taken out. It was separated into two layers. The upper layer was transparent and had a pH of 8, and the lower layer was a concentrated caustic soda solution.

A salt crystal was attached to the inside of the autoclave and was washed with methanol. It was dissolved in water and neutralized with diluted nitric acid. It was titrated with N/10—AgNO₃ to obtain 1.46 g of sodium chloride. The theoretical amount in the formula (1) is 1.314 g which is approximately equal to it.

The recovered DMI could be used as the decomposing agent.

EXAMPLE 2

A pressure resistant glass autoclave was charged with 1 g of Freon 11 and as a decomposing agent 100 ml of DMI, 3.2 g of caustic potash powder and 15 ml of water, and packed with a Teflon packing. It was heated at 80° C. for 2 hours with stirring. The amount of caustic soda is 1.3 times as much as the one calculated according to the above mentioned formula(2). The inside pressure increased 0.6 Kg/cm² and after 2 hours reduced to 0.2 Kg/cm². It was then cooled to ambient temperature.

After cooling, the autoclave was opened and the content was taken out.

A salt crystal was attached to the inside of the autoclave and was washed with methanol. It was dissolved in 100 ml of water and neutralized with 1N diluted nitric acid to precipitate silver chloride or silver fluoride. It was heated and mixed to dissolve the silver fluoride and the remaining silver chloride was filtered and dried to obtain 2.93 g of it. It equals 93.3% of the theoretical amount.

EXAMPLE 3

A pressure resistant glass autoclave was charged with 1 g of Freon 113 and as a decomposing agent 100 ml of DMI, 3.4 g of caustic soda powder and 15 ml of water, and packed with a Teflon packing. It was heated at 100° C. for 2.5 hours with stirring. The amount of caustic soda is 2 times as much as the one calculated according to the above mentioned formula(3). The inside pressure increased 0.5 Kg/cm² and after 2 hours reduced to 0.2 Kg/cm². It was then cooled to ambient temperature.

After cooling, the autoclave was opened and the content was taken out.

A salt crystal was attached to the inside of the autoclave and was washed with 30 ml of methanol. It was dissolved in 100 ml of water and neutralized with 1N diluted nitric acid and added 1N-silver nitrate solution to precipitate silver chloride or silver fluoride. It was heated to 100° C. and mixed to dissolve the silver fluoride and the remaining silver chloride was filtered and dried obtain 2.24 g of it. It equals to the theoretical amount (2.30 g).

EXAMPLE 4

A flask was charged with 100 ml of DMI, 10 g of caustic soda powder and 15 g of water, and heated to 90° C. with stirring. Then, air which contained 500 ppm of 1,1,1-trichloroethane was passed through the content at a flow rate of 0.1 liter/min. Initially, 1,1,1-trichloroethane was present at about 10 ppm in air, and after passing 200 liter, reduced to 30 to 35 ppm. This equaled a 96.5% decomposing rate.

EXAMPLE 5

A flask was charged with the decomposing agent of Example 3 and allowed to stand to separate the DMI layer. The DMI layer was mixed with 5 g of caustic potash and charged in another flask. The content was heated to 130° C. with mixing, through which 200 liter of air containing 500 ppm of 1,1,1-trichloroethane was passed at 0.1 liter/min. The beginning 100 liter had no 1,1,1-trichloroethane and the last 100 liter had less than 10 ppm. The decomposing rate nearly equals 100%.

EXAMPLE 6

A flask was charged with the decomposing agent of 100 ml of DMI, 10 g of cuastic soda powder and 10 ml of water, and heated to 90° C. with stirring through which 90 liter of air containing 1,000 ppm of Freon 11 was passed at 0.1 liter/min. The beginning 30 liter had a decomposing rate of 95%, the middle 30 liter had a decomposing rate of 94% and the last 30 liter had a decomposing rate of 91%. The average decomposing rate is 93.3%. In this case, the concentration of Freon 11 was less than 70 ppm.

EXAMPLE 7

A flask was charged with the decomposing agent of 100 ml of DMI and 10 g of caustic soda powder and heated to 120° C. with stirring, through which 100 liter of air containing 1,000 ppm of Freon 113 was passed at 0.1 liter/min. The decomposing rate was 96.3%. Then, another 100 liters of air containing 500 ppm of Freon 113 and was passed therethrough at 0.1 liter/min. The decomposing rate was 93.6%.

EXAMPLE 8

A flask was charged with the decomposing agent of 100 ml of DMI, 5 g of cuastic soda powder and 10 ml of water, to which 0.2 g of a perfluorohydrocarbon surfactant (available from Asahi Glass Co., Ltd. as Surflon S-141) was added, and heated to 90° C. with stirring. Through the content, 300 liter of air containing 1,000 ppm of 1,1,1-trichloroethane was passed at 0.2 liter/min. The beginning 100 liter had a 1,1,1-tichroloethane content of 0 to 10 ppm, the middle 100 liter had 10 to 20 ppm and the last 100 liter had 20 to 30 ppm. The average decomposing rate is 98%.

What is claimed is:

1. A process for treating a gas containing halogenated hydrocarbon gas, comprising the following steps:
(A) contacting said gas containing halogenated hydrocarbon gas with a solution which contains an aprotic polar compound represented by the following chemical formula:

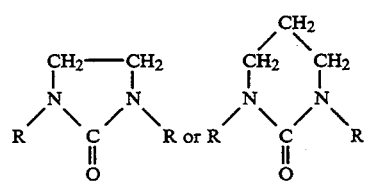

wherein R is an alkyl group having 1 to 3 carbon atoms, to absorb and recover a portion of the halogenated hydrocarbon, and
(B) contacting the gas which is exhausted from the step (A) and still contains halogenated hydrocarbon, with heating, with a mixture of the aprotic polar compound and a material selected from the group consisting of caustic soda, caustic potash, sodium carbonate and mixtures thereof to decompose the halogenated hydrocarbon gas.

2. The process according to claim 1 wherein said aprotic polar compound is 1,3-dimethyl-2-imidazolidinone (DMI), 1,3-dimethyl-2-oxohexahydropyrimidine or a mixture thereof.

3. A process for decomposing halogenated hydrocarbon in a gas phase, which comprises contacting the halogenated hydrocarbon gas with an agent for decomposing the halogenated hydrocarbon comprising a mixture of a material selected from the group consisting of caustic soda, caustic potash, sodium carbonate and mixtures thereof and an aprotic polar compound represented by the following chemical formula:

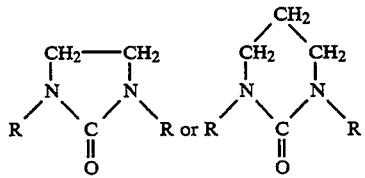

wherein R is an alkyl group having 1 to 3 carbon atoms thereby removing the halogenated hydrocarbon gas.

4. The process according to claim 3 wherein said aprotic polar compound is 1,3-dimethyl-2-imidazolidinone.

5. The process according to claim 3 wherein said contacting is carried out at a temperature of 50° to 150° C.

6. The process according to claim 3 wherein said contacting is carried out in the presence of an alkali-resistant surfactant.

* * * * *